No. 858,833. PATENTED JULY 2, 1907.
W. D. SMITH & G. L. & A. P. MACHRIS.
BOX MAKING APPARATUS.
APPLICATION FILED APR. 20, 1906.
2 SHEETS—SHEET 2.
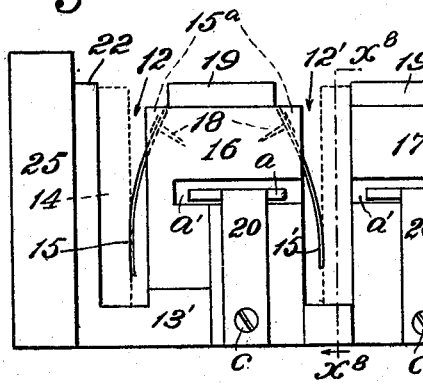
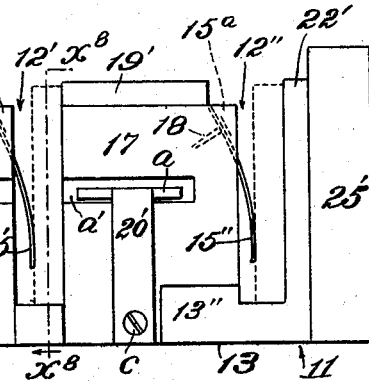
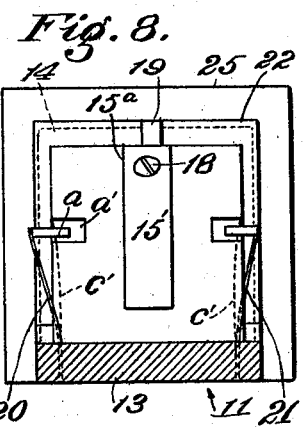
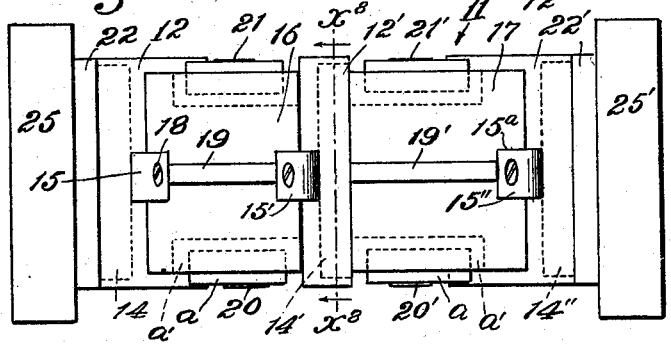
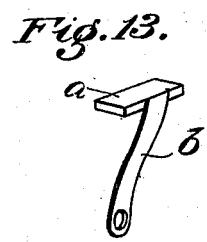
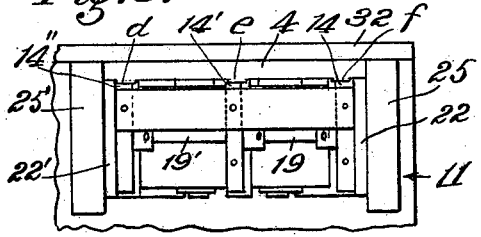
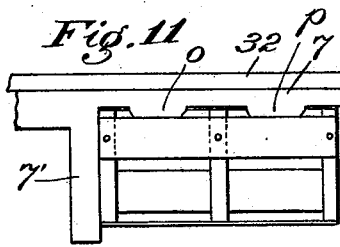
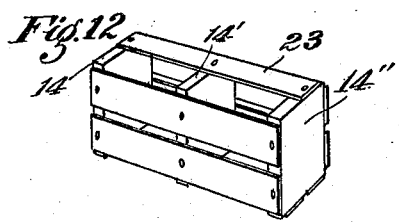
Witnesses:
C. C. Holly.
J Townsend
Inventors:
Willard D. Smith
George L. Machris
Alfred P. Machris.
by James R. Townsend
Their atty.
THE NORRIS PETERS CO., WASHINGTON, D. C.

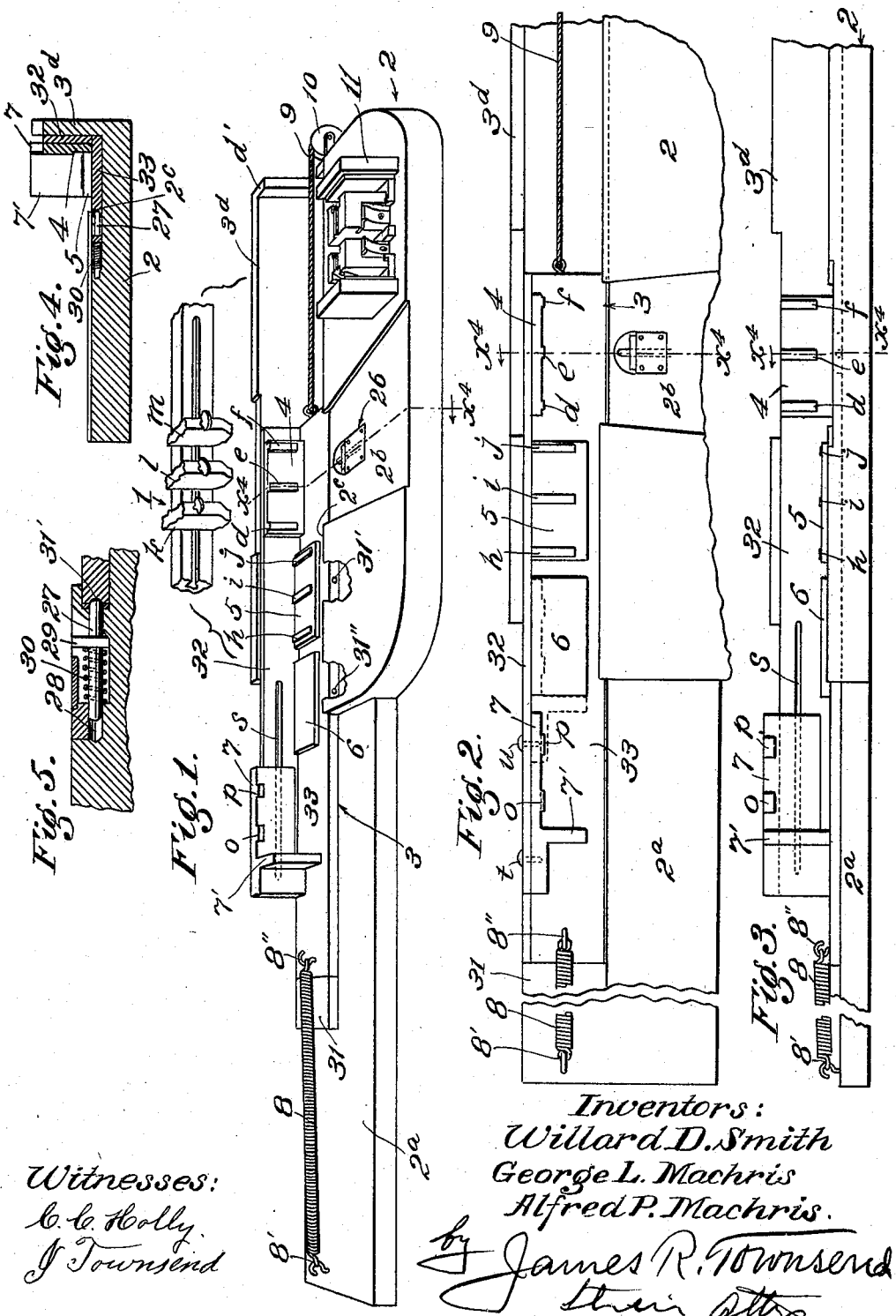

UNITED STATES PATENT OFFICE.

WILLARD D. SMITH, GEORGE L. MACHRIS, AND ALFRED P. MACHRIS, OF LOS ANGELES, CALIFORNIA; SAID SMITH ASSIGNOR TO SAID GEORGE L. MACHRIS AND ALFRED P. MACHRIS.

BOX-MAKING APPARATUS.

No. 858,833.　　　　Specification of Letters Patent.　　　　Patented July 2, 1907.

Application filed April 20, 1906. Serial No. 312,785.

*To all whom it may concern:*

Be it known that we, WILLARD D. SMITH, GEORGE L. MACHRIS, and ALFRED P. MACHRIS, citizens of the United States, residing in the city of Los Angeles, county of Los Angeles, and State of California, have invented a new and useful Box-Making Apparatus, of which the following is a specification.

An object of our invention is to provide means whereby boxes may be well constructed in a rapid, simple and convenient manner with the aid of nailing machines now in use.

Although box-making apparatus constructed according to the principles of this invention may be employed in making boxes of various sizes and shapes, this invention is more especially intended for making small boxes of the same construction and shape as fruit boxes, and intended to contain candy made up to imitate oranges or other fruit. Boxes of this special character are difficult to construct as rapidly as is necessary to bring their cost sufficiently low to serve the trade at a fair profit to the manufacturer. This difficulty arises from the number and small sizes of the pieces to be handled and the small value of the completed box.

This invention does not have to do with machinery for forming the separate elements of boxes, but is intended for use in assembling and fastening together parts previously cut into shape for forming a box.

With the above ends in view the invention consists in constructions and parts and in general and specific combinations of parts, hereinafter more particularly described.

Other objects and advantages of the invention may appear in the following detailed description taken in connection with the accompanying drawings illustrative of the invention.

The accompanying drawings illustrate the invention:

Figure 1 is a perspective view of the complete apparatus applied to a nailing machine a sufficient portion only of which is shown to illustrate the application of the invention thereto. The detached portable form for holding in place the elements of the box while nailing the same together, is shown resting upon the right end of the table. Fig. 2 is a plan of the apparatus shown in Fig. 1, omitting the form. Portions of the table are broken away to contract the view. Fig. 3 is a front elevation of what is shown in Fig. 2. Fig. 4 is a section on line $x^4$—$x^4$ of Figs. 1, 2 and 3 looking in the direction of the arrows. Fig. 5 is an enlarged sectional detail of the catch for stopping at predetermined points, the sliding carrier mounted at the back side of the table. Fig. 6 is a side elevation of the box-holding form. Fig. 7 is a plan thereof. Fig. 8 is a section thereof on line $x^8$—$x^8$ of Figs. 6 and 7. Fig. 9 is a fragmental plan showing the form in contact with the spacing means used in nailing on the first and second side-pieces of a box. Fig. 10 likewise shows the form in contact with the spacing means used in nailing on the third, fourth, fifth and sixth side-pieces. Fig. 11 shows the partially completed box after the same has been removed from the form, in contact with the auxiliary spacing slide used in nailing on the seventh side-piece which is shown attached. Fig. 12 is a perspective view of the box shown in Fig. 11 one side-piece being omitted to provide an opening for filling. Fig. 13 is a perspective of one of the yielding spacing members.

Beneath the nail-driving device 1 of a nailing machine is mounted table 2 provided at the rear side thereof with a carrier 3 upon which is mounted a plurality of spacing devices 4, 5 and 6 and an auxiliary spacing slide 7 mounted on carrier 3 to move relatively thereto. Slide 7 is controlled in its movement by a longitudinal slot $s$ in the upright portion 32 of carrier 3, said slide being provided with headed pins $t$ and $u$ which extend through slot $s$ to fasten the slide 7 in place and cause it to stop at the proper point when at the inward limit of its travel to bring the arm 7′ of the slide into the correct position. A spring 8 automatically moves said carrier 3 in one direction and a connection 9 is provided for moving said carrier against the tension of spring 8. Said connection 9 desirably consists of a flexible cord, which is led downwardly over a pulley 10 to a treadle or other operating means, not shown. The spring 8 is fastened at its outer end 8′ to an extension 2ª of the table 2. At its other end said spring is fastened to carrier 3 by a hook 8″.

11 designates a detached portable form for holding in place the elements of a box, while the nail-driving device drives the nails downwardly thereto, having for this purpose seats 12, 12′ and 12″ opening out at three sides thereof.

In Fig. 1 the carrier 3 is shown in retracted position ready for the first step of making a box, the spacing device 4 being beneath the nail-driving means 1.

Referring more particularly to Figs. 6, 7 and 8 for the purpose of describing form 11: The form consists of a substantially rectangular block having a plurality of seats 12, 12′ and 12″ cut transversely into one side thereof in the form of widened saw kerfs extending to the back portion 13 of the block and spaced apart to correspond with the distances between the cross-pieces 14, 14′ and 14″ of the box shown in Fig. 12. The seats 12, 12′ and 12″ are provided with leaf springs 15, 15′ and 15″ which are secured to the solid sections 16 and 17 of the form by fastening devices 18. Said springs tend to move transversely into the seats 12, 12′ and 12″, so that when the cross-pieces 14, 14′ and 14″ are inserted into the seats said springs will hold them yieldingly in place. 19 and 19′ are stationary spacing-stops extending outwardly from the front of the solid sections 16 and 17 of the form and located at the mid-width thereof in the manner shown in Figs. 6 and 7. On each side of the block is located a pair of movable spring-actuated spacing-stops. 20 and 20′ indicate these stops on one side of the block and 21 and 21′ the stops on the other side of the block. These stops are all of the same form, one of them being shown in detail in Fig. 13; a indicates the stop proper, b the resilient portion thereof and c the screw for holding the same in place on the block shown in Figs. 6, 7 and 8. The purpose and operation of the spring-actuated stops will be described later. 22 and 22′ designates spacing beads, one near each end of the form to adjust the longitudinal position of the box side-pieces 23 (see Fig. 12). 25 and 25′ are form-spacing abutments consisting of large rectangular beads or heads, one at each end of the form, projecting an equal distance from the front and each side thereof to regulate the distance of the form from the upright portion of carrier 3 shown in Fig. 1 as will be more fully described later.

During the process of making a box the form 11 when in operative position is always located directly beneath the nail-driving device 1, the carrier 3 being shifted to the right to bring the spacing devices 4, 5 and 6 successively under the nail-driving means to properly adjust the form 11 toward the front and rear as the different sides thereof are placed in uppermost position to support the side-pieces 23 while the same are nailed to the cross-pieces 14, 14′ and 14″.

In order to bring each of the spacing devices 4, 5 and 6 successively and accurately into operative position, a catch 26 is provided. Said catch is composed of a draw-bolt 27 playing in the recess 28 in the table 2, and having fixed thereto an operating lug 29 against which the spiral spring 30 around bolt 27 bears to normally push said bolt successively into the sockets 31′ and 31″.

The stop 31 stops carrier 3 when the spacing device 4 is at operative position shown in Fig. 2. The socket 31′ is opposite the spacing device 5 and the socket 31″ is opposite the spacing device 6. Said sockets 31′ and 31″ are shown in Fig. 1 at the points where the table is broken away. It will be noted that the spacing device 4 stands in an upright position being secured to an upright wall 32 with which the carrier 3 is provided, while the spacing devices 5 and 6 lie in a horizontal position, being secured to the horizontal portion or base 33 of carrier 3.

The spacing devices 4, 5 and 6 each consist of blocks having cleats fastened to their outer faces. In the spacing device 4, d, e and f designate three cleats which are spaced apart to correspond with and fit against the cross-pieces 14, 14′ and 14″ of the box being formed. The spacing device 5 is likewise provided with three cleats h, i and j.

Each of the spacing devices 4, 5 and 6 extends the distance required for centering the cross-pieces of the boxes at an equal distance from the sides of the form 11, the springs 15, 15′, and 15″ yieldingly holding the cross-pieces in the positions to which they are moved by the spacing means.

The beveled yielding stops 20, 20′ and 21, 21′ have shoulders a and are formed with their beveled portions b sloping toward the back 13 of the form, and away from the front thereof where the cross-piece-spacing-stops or lugs 19 and 19′ are located; so that when pieces have been nailed to three sides of the box it may be withdrawn from the front of the form, the yielding beveled stops being forced back from the opening between the side-pieces at each side of the box.

In the operation of making a box the cross-pieces 14, 14′ and 14″ are first inserted into the seats 12, 12′ and 12″ against the pressure of the springs 15, 15′ and 15″. The box is turned with the back 13 downward and one side thereof is presented to and pressed against the spacing device 4. One of the end form-spacing heads, for example, the head 25, being brought against the right end of the spacing device as shown in Fig. 9, the cross-pieces 14, 14′ and 14″ register with the cleats d, e, f, and are thereby held in the proper position at precisely the mid-width of the form, the operator using his thumbs to press the cross-pieces back firmly against the cleats. The first side-piece is now placed upon the top of the form with its edge nearest the operator drawn back against the stationary spacing stops 19, 19′, the ends of the side-piece being fitted between the beads 22 and 22′. The nail-driving device now being operated a nail will be driven through the side-piece into each of the cross-pieces 14, 14′ and 14″ by the nail-driving elements k, l and m. The form is now turned end for end, as in Fig. 7, and again pressed against the spacing device 4 the head 25′ being now brought into contact with the right end of the spacing device 5, and the nailing operation repeated as in the first instance, the second side-piece having been brought against the reverse side of the stationary side-piece-spacing stops 19, 19′. The operator now withdraws the form from the carrier 3, and through the operation of connection 9 moves the carrier 3 to the right until the catch-bolt 27 enters the socket 31′ opposite the spacing device 5. The form is now placed upon the spacing device 5 with its back 13 toward the operator and the spacing head 25 fitting between and engaging each of the adjacent ends of the spacing devices 5 and 6. In this position, shown by Fig. 6, if considered a plan view, the form is pressed against the upright wall 32 and a third side-piece is placed upon the farther portion of the top thereof and drawn back toward the operator until the edge thereof engages the stop portions a of the yielding stops 20 and 20′ and the nailing operation is repeated. The form is now turned end for end, the back 13 thereof being pressed against the upright wall 32 as shown in Fig. 10 and the head 25′ inserted between the spacing devices 5 and 6. The fourth side-piece is now placed on top of the form and withdrawn against stop portions 13′ and 13″ located near the back 13 of the form in position to properly locate said side-piece. This side-piece is held down by the operator against the pressure of springs 20 and 20′ and the nail-drivers operated as before. In putting on the two last-mentioned side-pieces the cleats, h, i and j hold the end-pieces of the box up in the proper position against the pressure of the nail-driving means. The carrier being again shifted to the right, the bolt 27 is caused to register with the socket 31″ opposite the spacing device 6, which is not provided with any cleats on the upper side thereof because the thickness of the third and fourth side-pieces nailed to the box compensates for the thickness of the cleats h, i and j. The side of the form to which side-pieces have already been nailed is now placed upon the spacing device 6, the front of the form being placed against the wall 32 and the heads 25 and 25′ fitting over the ends of spacing-block 6. While in this position the fifth side-piece is held upon the box and nailed on being spaced by stops a in the same manner (see Fig. 13) as the third side-piece. The form is then turned end for end and the sixth side-piece secured thereto in a manner corresponding to the attachment of the fourth side-piece. Fig. 10 shows the position of the form in nailing on the sixth side-piece. The operator now removes the form from the carrier 3 and withdraws the partially completed box therefrom, spring stops 20, 20′, 21 and 21′ yieldingly allow the box to be withdrawn toward the front of the form. The form is now dispensed with until a new box is begun. Slide 7 is now moved to the right until the extension 7′ thereof comes to the point indicated in dotted lines in Fig. 2 of the drawings and the body portion thereof forms a spacing block opposite the wall 32 and above the spacing device 6. The thickness and position of the parts 7 and 7′ are such that when the box is fitted into the angular slide 7 the seventh cross-piece may be nailed thereto in the right place, stops o and p being provided on the slide to hold this side-piece in place. The nailing operation being once more performed the box is ready for filling, one side-piece only being unsecured to the box in order that an opening may be left through which the contents of the box may be inserted.

From the foregoing description it will be seen that the plurality of spacing means 4, 5 and 6 being mounted on the carrier 3, are provided with means for being progressively shifted into a position in operative relation to the nailing means 1, the catch 26 constituting a means for accurately predetermining the position of said spacing means 5 and 6 beneath the nail-drivers; and the detached form 11 being adjustable to present different sides thereof to said spacing means operates in combination therewith in forming a box.

The back 13 of the form 11 is of such a width opposite the seats 12, 12′ and 12″ that when the cross-pieces of the box are fully inserted they occupy a position at precisely the mid-height of the form.

As shown in the drawings the beads 22 and 22′ extend from all sides of the inserted cross-pieces of the box a distance equal to the thickness of the side-pieces 23.

The table 2 is preferably provided with a shallow way 2$^b$ having sides converging toward the farther end and having a width at that end equal to the length of the form to assist the operator in sliding the form into correct position under the nail-drivers.

Carrier 3 is guided under a retaining bead 2$^c$ between the body portion of table 2 on one side and an upright back 3$^d$ with which the table is provided. Back 3$^d$ may have a forwardly projecting stop portion d′ at the right end to stop the carrier when the third spacing device 6 has reached operative position.

To allow the stop portions a at the free ends of springs 20, 20′ 21, and 21′ room to operate, recesses a′ are provided in the sides of form block 11. In order not to interfere with the various spacing devices which adjust the position of the form, these springs and also leaf springs 15, 15′ and 15″ are respectively set into recessed portions c′ and 15$^a$ with which the block 11 is provided. The position of the inserted cross-pieces of a box in the form is indicated in dotted lines in Figs. 6 and 7.

It will be understood that a variety of spacing means may be used both to properly locate the form and adjust the side-pieces in position thereon, without departing from the spirit of this invention, reference being made more particularly to the spacing elements formed by cleats d, e, f, h, i and j and the spacing lugs 19 and 19′ all of which may be formed as elongated strips or may consist of a greater number of shorter projections.

By employing yielding arms, herein shown as leaf springs 15, 15′, 15″ extending obliquely into the seats for the cross-pieces of the box, as retaining means therefor, said seats may be formed as cuts extending into a wooden block. This form of retaining means is of especial advantage for the middle seat 12′ as the spring may be fastened near the edge of the seat without making any deep cut into the block for the sole purpose of attaching the spring. The simple one-piece block used for the form in this invention is much cheaper to manufacture than a built-up form made of separate pieces. The use of such an improved form is made possible by combining therewith the above described retaining springs in the manner set forth.

What we claim is:

1. In combination with nailing means, a form having a head at each end projecting equally from different sides and seats between said heads opening at different sides, and a support having an upright wall adapted to engage said heads to position the form for the nailing means.

2. A form consisting of a block having seats in the form of kerfs cut thereinto to receive pieces of a box, rear stop means limiting the insertion of said pieces, and leaf springs at the sides of the form forming beveled stops sloping away from the front thereof, said springs having stop portions at the front ends thereof, there being lateral recesses in said block to receive said springs and stop portions.

3. The combination, with a nailing machine adapted to drive nails in a downward direction, of a form having seats adapted to seat pieces of a box, a horizontally movable carrier, a horizontal guide for said carrier, means for moving said carrier along said guide, and a plurality of spacing devices mounted on said carrier and adapted to adjust the position of said pieces in said seats.

4. The combination, with a nailing machine, of a form having seats adapted to seat pieces of a box, a carrier, an upright spacing device on said carrier, a horizontal spacing device on said carrier, and means for moving said carrier to bring one of said spacing devices into the position vacated by the other, said form being adjustable to present different sides thereof to said spacing devices.

5. The combination, with the nail-drivers of a nailing machine, of a carrier, a plurality of spacing devices mounted on said carrier in fixed relation thereto, means for shifting said carrier to bring said spacing devices progressively underneath the nail-drivers, an auxiliary spacing device mounted on said carrier and movable with relation thereto into and out of register with one of the first-mentioned spacing devices, and a portable form having a plurality of seats adapted to seat pieces of a box in register with said spacing devices.

6. The combination, with a nailing machine adapted to drive nails in a downward direction, of a horizontally movable spacing device having a plurality of cleats thereon, a horizontal guide for said device, means for moving said device along said guide, and a form having a plurality of seats adapted to seat pieces of a box and to register with said cleats.

7. The combination, with a nailing machine adapted to drive nails in a downward direction, of a horizontally movable device having a plurality of spacing elements thereon, a horizontal guide for said device, means for moving said device along said guide, and a form having a plurality of seats adapted to seat pieces of a box and to register with said spacing elements.

8. The combination, with a nailing machine adapted to drive nails in a downward direction, of a horizontally movable device having a plurality of spacing elements thereon, a horizontal guide for said device, means for moving said device along said guide, and a form having a plurality of seats opening at different sides thereof and adapted to seat pieces of a box and to register with said spacing elements.

9. The combination, with the nail drivers of a nailing machine, of a carrier, a plurality of spacing devices mounted on said carrier to be shifted underneath the naildrivers thereby, a plurality of spacing elements on said spacing devices, and a form having a plurality of seats adapted to seat pieces of a box and to register with said spacing elements.

10. The combination, with a machine provided with nailing means, of a plurality of spacing means, means for progressively shifting said spacing means to a point in operative relation to the nailing means, and a form adjustable to present different sides to said spacing means.

11. The combination, with a machine provided with nailing means, of a movable carrier, a form adjustable to present different sides to said carrier, a plurality of spacing means mounted on the carrier, and means for progressively shifting said spacing means to a position in operative relation to the nailing means.

12. The combination, with a nailing machine of a form having seats to hold portions of a box, a movable carrier having a plurality of spacing means to engage said portions, and stop means for stopping said carrier at predetermined points.

13. The combination, with a machine provided with nailing means adapted to drive nails in one direction only, of a movable carrier of angular shape in cross section, a plurality of spacing means mounted on said carrier upon each angular portion thereof, means for progressively shifting said spacing means to a position in operative relation to the nailing means, and a form adjustable to present different sides thereof to said carrier.

14. The combination, with a machine provided with means for driving nails in a downward direction, of a support having an upright and a horizontal wall, spacing means mounted on the face of each of said walls, and a form adapted to yieldingly hold the elements of a box in register with said spacing devices.

In testimony whereof, we have hereunto set our hands at Los Angeles, California, this 13th day of April, 1906.

WILLARD D. SMITH.
GEORGE L. MACHRIS.
ALFRED P. MACHRIS.

In presence of—
ALBERT H. MERRILL,
JULIA TOWNSEND.